UNITED STATES PATENT OFFICE.

MATHEW J. MANIX, OF KANSAS CITY, MISSOURI.

DISINFECTING COMPOUND.

No. 811,074.     Specification of Letters Patent.     Patented Jan. 30, 1906.

Application filed April 21, 1905. Serial No. 256,818.

*To all whom it may concern:*

Be it known that I, MATHEW J. MANIX, a citizen of the United States, residing at Kansas City, in the county of Jackson and State of Missouri, have invented certain new and useful Improvements in Disinfecting Compounds, of which the following is a specification.

My invention relates to a new compound which may be employed as a fumigator for disinfecting purposes or for destroying vermin—such, for instance, as bedbugs, flies, mosquitos, roaches, lice, &c.—found in buildings or on cattle or fowls.

Said compound comprises the following ingredients: potassium chlorate, two ounces; sulfur, two ounces; strontium nitrate, six ounces; shellac, one ounce; potassium nitrate, one ounce; sawdust, fifteen ounces.

The ingredients are pulverized, mixed, and kneaded to the consistency of paste, then placed in pasteboard tubes and permitted to dry and harden preparatory to use.

The dried compound has the property of being easily lighted and is used in the following manner: One of the tubes containing the compound is placed in the apartment infested with the vermin or to be disinfected and is ignited. The compound burns freely and discharges gases which soon kill the vermin or germs.

Having thus described my invention, what I claim, and desire to secure by Letters Patent, is—

1. A disinfecting compound comprising potassium chlorate, sulfur, strontium nitrate, shellac, potassium nitrate and sawdust.

2. A disinfecting compound comprising potassium chlorate two ounces, sulfur two ounces, strontium nitrate six ounces, shellac one ounce, potassium nitrate one ounce, sawdust fifteen ounces, kneaded into a paste and permitted to dry in pasteboard tubes.

In testimony whereof I affix my signature in the presence of two witnesses.

MATHEW J. MANIX.

Witnesses:
    J. W. BOLING,
    F. G. FISCHER.